(12) United States Patent
Lee

(10) Patent No.: US 11,237,742 B2
(45) Date of Patent: Feb. 1, 2022

(54) APPARATUS AND METHOD FOR CONTROLLING DATA STORED IN MEMORY SYSTEM

(71) Applicant: SK hynix Inc., Gyeonggi-do (KR)

(72) Inventor: Kyung-Soo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/572,098

(22) Filed: Sep. 16, 2019

(65) Prior Publication Data
US 2020/0183588 A1    Jun. 11, 2020

(30) Foreign Application Priority Data

Dec. 6, 2018  (KR) .................. 10-2018-0155908

(51) Int. Cl.
G06F 12/00 (2006.01)
G06F 3/06 (2006.01)
G06F 12/02 (2006.01)

(52) U.S. Cl.
CPC ............ *G06F 3/064* (2013.01); *G06F 3/0649* (2013.01); *G06F 3/0652* (2013.01); *G06F 3/0658* (2013.01); *G06F 3/0679* (2013.01); *G06F 12/0253* (2013.01); *G06F 3/0607* (2013.01); *G06F 2212/7211* (2013.01)

(58) Field of Classification Search
CPC ...... G06F 3/064; G06F 3/0649; G06F 3/0652; G06F 3/0658; G06F 3/0679; G06F 12/0253; G06F 3/0607; G06F 2212/721
See application file for complete search history.

(56) References Cited

U.S. PATENT DOCUMENTS

| 5,737,742 A * | 4/1998 | Achiwa ................. G06F 12/023 365/189.09 |
| 5,963,474 A * | 10/1999 | Uno ...................... G06F 3/0614 365/185.04 |
| 6,000,006 A * | 12/1999 | Bruce ................. G06F 11/1068 711/103 |
| 7,913,032 B1 * | 3/2011 | Cornwell ............ G06F 12/0246 711/103 |
| 9,747,202 B1 | 8/2017 | Shaharabany et al. |
| 2006/0288153 A1 * | 12/2006 | Tanaka ................ G06F 12/1425 711/103 |
| 2007/0208904 A1 * | 9/2007 | Hsieh ................. G11C 16/3495 711/103 |
| 2007/0233931 A1 * | 10/2007 | Tanaka ................ G06F 12/0246 711/5 |
| 2009/0327591 A1 * | 12/2009 | Moshayedi ......... G06F 11/1441 711/103 |
| 2011/0264843 A1 * | 10/2011 | Haines ................. G06F 3/0616 711/103 |
| 2016/0188226 A1 * | 6/2016 | Haines ................. G06F 3/0619 711/103 |

(Continued)

*Primary Examiner* — Shawn X Gu
(74) *Attorney, Agent, or Firm* — IP & T Group LLP

(57) ABSTRACT

A memory system includes a memory device including a plurality of memory blocks and a controller. At least one memory block among the plurality of memory blocks is allocated for one of data attributes. The controller can determine a first data attribute of first data stored in the memory device, based on a first map information item of the first data, and migrate the first data having the first data attribute to a memory block allocated for the first data attribute among the plurality of memory blocks.

20 Claims, 13 Drawing Sheets

(56) References Cited

U.S. PATENT DOCUMENTS

2016/0306554 A1 10/2016 Li et al.
2017/0017405 A1 1/2017 Dubeyko et al.
2018/0267705 A1* 9/2018 Liu ...................... G06F 3/0655

* cited by examiner

FIG. 7
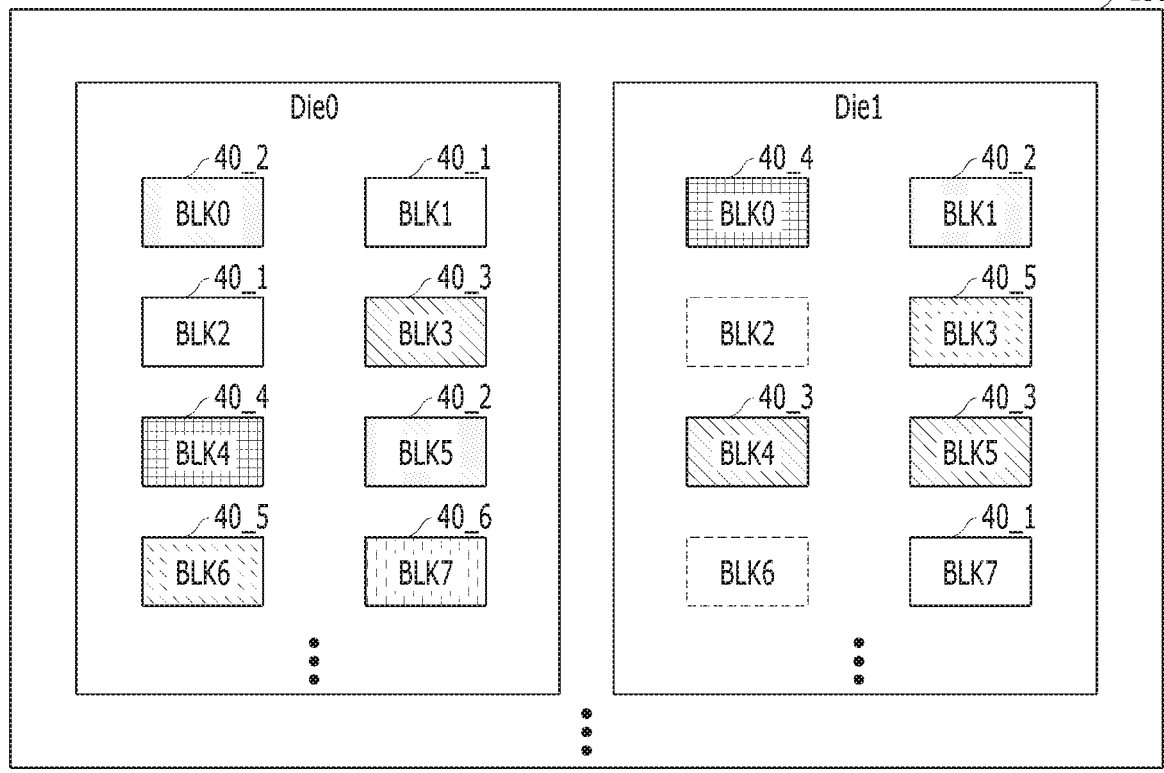
 - Hot and Short
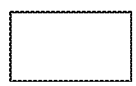 - Hot and Long
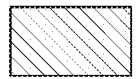 - Warm and Long
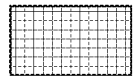 - Warm and Short
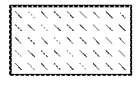 - Cold and Long
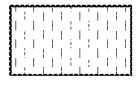 - Cold and Short

APPARATUS AND METHOD FOR CONTROLLING DATA STORED IN MEMORY SYSTEM

CROSS-REFERENCE TO RELATED APPLICATION

This patent application claims priority under 35 U.S.C. § 119(a) to Korean Patent Application No. 10-2018-0155908, filed on Dec. 6, 2018, the entire disclosure of which is incorporated herein by reference.

TECHNICAL FIELD

Various embodiments of the invention relate to a memory system, and more particularly, to an apparatus and a method for maintaining, controlling and managing data stored in a nonvolatile memory device in the memory system.

BACKGROUND

Recently, the computer environment paradigm has shifted to ubiquitous computing, which enables a computer system to be accessed anytime and anywhere. As a result, the use of portable electronic devices such as mobile phones, digital cameras, notebook computers and the like is increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device used as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

BRIEF DESCRIPTION OF THE DRAWINGS

The description herein makes reference to the accompanying drawings wherein like reference numerals refer to like parts throughout the several views, and wherein:

FIG. 7 shows an example of allocating or assigning blocks according to attributes of data in a memory device according to an embodiment of the disclosure;

DETAILED DESCRIPTION

Figure 1:
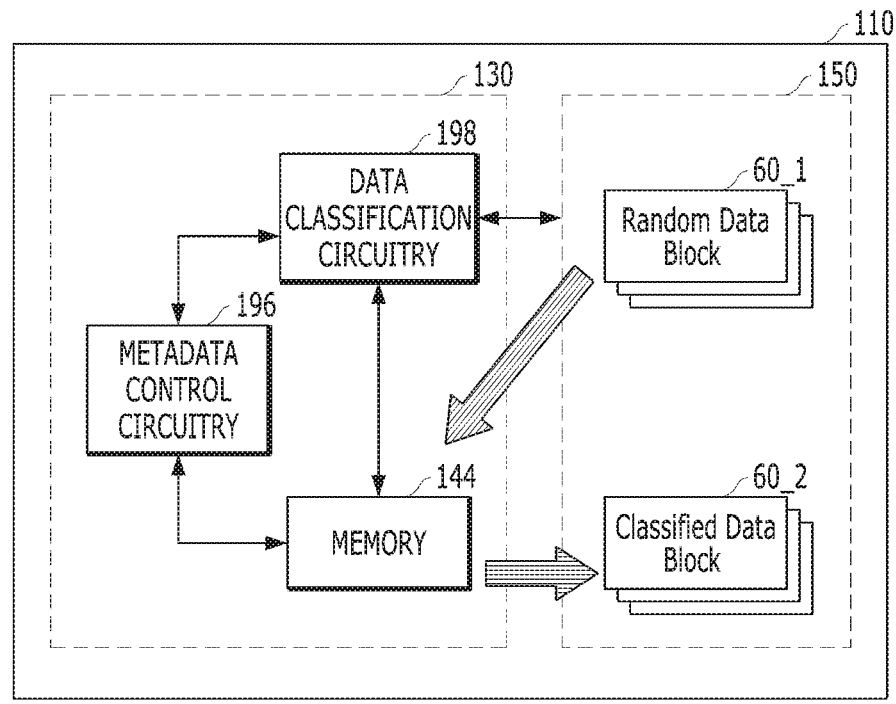
FIG. 1 shows a first example of an apparatus capable of classifying data stored in a memory system in accordance with an embodiment of the disclosure.

Various examples of the disclosure are described below in more detail with reference to the accompanying drawings. Aspects and features of the present invention, however, may be embodied in different ways to form other embodiments, including variations of any of the disclosed embodiments. Thus, the present invention is not to be construed as being limited to the embodiments set forth herein. Rather, the described embodiments are provided so that this disclosure is thorough and complete and fully conveys the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

It is noted that reference to "an embodiment," "another embodiment" or the like does not necessarily mean only one embodiment, and different references to any such phrase are not necessarily to the same embodiment(s).

Embodiments of the disclosure provide a memory system, a data processing system, and an operation process or a method, which quickly and reliably process data into a memory device by reducing operational complexity and performance degradation of the memory system, thereby enhancing usage efficiency of the memory device.

In addition, embodiments of the disclosure provide a method and an apparatus for storing data in a block of a memory device, based on attributes of data, to improve or enhance data input/output performance and easily determine a block to be subjected to garbage collection.

Embodiments of the disclosure provide a method and an apparatus for determining an access frequency and a retention period of data stored in a memory device, based on a write count and an erase count corresponding to an address of the data.

Embodiments of the disclosure provide a method and an apparatus for temporarily storing data in a volatile memory device, instead of a nonvolatile memory device, according to an attribute of the data to be stored in the memory device, to avoid deterioration of durability of a specific block or a specific page in the nonvolatile memory device.

Embodiments of the disclosure provide a method and an apparatus for determining characteristics of an application that uses or generates data based on attributes of the data stored in the memory device, providing information about the application to a user, or estimating a size and a frequency of data that may be driven or utilized by the application.

In an embodiment, a memory system may include a memory device including a plurality of memory blocks, wherein at least one memory block among the plurality of memory blocks is allocated for one of data attributes; and a controller configured to determine a first data attribute of first data stored in the memory device, based on a first map information item of the first data, and to migrate the first data having the first data attribute to a memory block allocated for the first data attribute among the plurality of memory blocks.

The controller may be configured to determine a second data attribute of second data entered from an external, based on a second map information item of the second data, and to store the second data having the second data attribute to a memory block allocated for the second data attribute among the plurality of memory blocks.

By the way of example but not limitation, the data attributes are distinguished based on a data temperature, which indicates an access frequency of data, and a data lifetime, which reflects a data update period.

The first map information item includes a first logical address of the first data, a write count which is increased in response to a write operation corresponding to the first logical address, and an erase count which is increased in response to an erase operation corresponding to the first logical address, and the data lifetime is determined by the write count and the erase count.

The first map information item includes a first logical address of the first data and a reference count corresponding to the first logical address, the reference count is increased when an update/modification, read or write operation is performed, and the data temperature is determined by the reference count.

The controller may be configured to generate an internal command for determining the data temperature and the data lifetime as a background operation, and to reset plural counts used for determining the data temperature and the data lifetime after the data temperature and the data lifetime is determined in response to the internal command.

The controller may be configured to determine, when a write count corresponding to a logical address is greater than an erase count corresponding to the logical address, that: the data lifetime is determined to be long when the write count is less than a set threshold; or the data lifetime is determined to be short when the write count is greater than or equal to the set threshold.

The controller may be configured to determine that: the data lifetime is not available when the write count is equal to the erase count; or the write count and the erase count are reset when the write count is less than the erase count.

The controller may be configured to determine that: the data temperature corresponding to a logical address is determined to be hot when a reference count corresponding to the logical address is greater than a first threshold; the data temperature corresponding to the logical address is determined to be cold when the reference count corresponding to the logical address is less than a second threshold; or the data temperature corresponding to the logical address is determined to be warm when the reference count corresponding to the logical address is between the first and second thresholds.

The controller is configured to perform garbage collection or wear levelling operation for the at least one memory block according to each of the data attributes.

When the controller and the memory device is coupled with each other via plural channels, memory blocks allocated alternatively between the plural channels are assigned for each of the data attributes.

In another embodiment, a method for operating a memory system may include allocating at least one memory block among a plurality of memory blocks in a memory device for each of data attributes; determining a first data attribute of first data stored in the memory device based on a first map information item of the first data; and migrating the first data having the first attribute to a memory block allocated for the first data attribute among the plurality of memory blocks.

The method may further include determining a second data attribute of second data entered from an external, based on a second map information item of the second data; and storing the second data having the second data attribute to a memory block allocated for the second data attribute among the plurality of memory blocks.

The data attributes may be distinguished based on a data temperature, which indicates an access frequency of data, and a data lifetime, which reflects a data update period.

The method may further include generating an internal command for determining the data temperature and the data lifetime as a background operation; and resetting plural counts used for determining the data temperature and the data lifetime after the data temperature and the data lifetime is determined in response to the internal command.

The determining the first data attribute includes: when a write count corresponding to a logical address is greater than an erase count corresponding to the logical address, determining that a data lifetime is long when the write count is less than a set threshold; or determining that the data lifetime is short when the write count is greater than or equal to the set threshold.

The determining the first data attribute further includes: determining that the data lifetime is not available when the write count is equal to the erase count; or determining that the write count and the delete count is reset when the write count is less than the erase count.

The determining the first data attribute includes: determining that a data temperature corresponding to a logical address is hot when a reference count corresponding to the logical address is greater than a first threshold; determining that the data temperature corresponding to the logical address is cold when the reference count corresponding to the logical address is less than a second threshold; or determining that the data temperature corresponding to the logical address is warm when the reference count corresponding to the logical address is between the first and second thresholds.

The method further includes perform garbage collection or wear levelling operation for the at least one memory block according to each of the data attributes.

In another embodiment, an apparatus for controlling firmware in a memory system includes at least one processor and at least one memory including computer program code. The at least one memory and the computer program code are configured, with the at least one processor, to cause the apparatus to: allocate at least one memory block among a plurality of memory blocks in a memory device for each of data attributes; determine a first data attribute of first data stored in the memory device based on a first map information item of the first data; and migrate the first data having the first attribute to a memory block allocated for the first data attribute among a plurality of memory blocks.

In another embodiment, a memory system can include a memory device including a plurality of memory blocks, which stores multiple pieces of data; and a controller suitable for: determining attributes of the multiple pieces of data; classifying the multiple pieces of data based on the determined attributes; and rearranging the plurality of memory blocks such that pieces of data having the same attribute are to be stored in adjacent blocks among the plurality of memory blocks.

Embodiments of the disclosure are described in detail below with reference to the accompanying drawings, wherein like numbers reference like elements.

FIG. 1 illustrates a first example of an apparatus capable of classifying data in a memory system 110 according to an embodiment of the disclosure. In FIG. 1, the memory system 110 may include a memory device 150 that includes non-volatile memory cells and a controller 130 that may control input and output of data for the memory device 150.

Although not shown, the memory device 150 may be physically divided into a plurality of pages, a plurality of blocks, a plurality of planes, or a plurality of dies. By the way of example but not limitation, a page may include a plurality of non-volatile memory cells, and a block may include a plurality of pages.

Data to be stored in the memory device 150 according to a usage of the memory system 110 may be roughly classified into two types. One is user data transferred or inputted from an external device or an interworking device (e.g., a host). The other is metadata which is necessary to store, maintain, control and manage the user data in the memory device 150 as a nonvolatile device. The metadata may be generated, maintained or managed by the memory system 110. Alternatively, the user data may be generated and inputted by a user, an apparatus, software, or the like, which is engaged with the memory system 110.

The user data may have different characteristics or attributes depending on a user or an apparatus interlocked with the memory system 110. For example, some user data may not be deleted for a long time after being stored in the memory system 110, but other user data may be repeatedly updated for a very short time. For another example, some user data may be frequently accessed and read, but other user data may not be frequently accessed. According to an embodiment, the user data may be divided or classified according to data attributes such as a temperature of data (hereinafter referred to as a data temperature) and a lifetime of data (hereinafter referred to as a data lifetime). The data temperature may be determined as one of hot (e.g., frequently accessed), cold (e.g., rarely accessed), and warm (e.g., accessed by a frequency between hot and cold). The data lifetime may be determined as one of long (e.g., updated or deleted after a long time) and short (e.g., frequently updated or deleted in a short time).

The memory device 150 may include memory blocks 60_1, 60_2 having different properties. For example, the memory device 150 may include a random data block 60_1 which may store data regardless of data attributes, and a classified data block 60_2 which may store data classified corresponding to each of the data attributes. Although not shown, at least one block in memory device 150 may be allocated for each of the data attributes. According to an embodiment, the data attribute assigned to a specific memory block in the memory device 150 may be changed through an operation for garbage collection or wear leveling.

The random data block 60_1 may store data delivered to the memory device 150 regardless of the data attribute. For example, when data corresponding to a new logical address (e.g., logical block address (LBA)) is delivered into the memory device 150, the controller 130 may not understand which data attribute the delivered data has. Data of which data attribute is not determined yet may be stored in the random data block 60_1. When the controller 130 processes a large amount of tasks for a short time, data caused by the large amount of tasks may not be instantly classified according to each of data attributes to improve or secure data input/output performance of the memory system 110. In this case, after temporarily storing the data in the random data block 60_1, the controller 130 may classify the temporarily stored data according to each of the data attributes and store the classified data to the data block 60_2 in an idle state or in a state when there is an operational margin of the data input/output performance.

According to an embodiment, the controller 130 may include a metadata control circuitry 196, a data classification circuitry 198, and a memory 144. As used in the disclosure, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

The metadata control circuitry 196 may control logical addresses and physical addresses of data stored in the memory device 150. The controller 130 may receive commands or instructions for reading, storing, or erasing data stored in the memory device 150 from an external device (e.g., a host). An apparatus that is engaged with the controller 130 may transfer a logical address with a command. The metadata control circuitry 196 may also control parameters or variables (e.g., read counts, write counts, or erase counts), which are used for determining the data attribute and relevant to the logical address which may be delivered with the command.

The data classification circuitry 198 may determine the data attributes of each data based on the parameters or the variables (e.g., the read count, the write count, or the erase count). By the way of example but not limitation, the data classification circuitry 198 may determine the data temperature (e.g., hot, cold, or warm) and the data lifetime (e.g., long or short) of each data. Once the data temperature and the data lifetime are determined or updated, the data may be stored or migrated into the classified data block 60_2 allocated for the corresponding data attribute.

The memory 144 may temporarily store data to be stored in the memory device 150. Further, the memory 144 may store a map data table including information generated or caused by operations of the metadata control circuitry 196 and the data classification circuitry 198, a data attribute or plural parameters corresponding to the logical address, and the like.

Regarding data stored in the random data block 60_1, the data classification circuitry 198 may check parameters or the variables, corresponding to a logical address of the data, controlled by the metadata control circuitry 196. The data classification circuitry 198 may determine a data attribute based on a parameter or a variable corresponding to the logical address. The data classification circuitry 198 may determine the data attributes and then load data stored in the random data block 60_1 into the memory 144 and then migrate the data loaded in the memory 144 to the classified data blocks 60_2 according to the data attribute of the data.

The data classification circuitry 198 moves (or migrates) the data and notifies the map information management circuitry 196 of the data movement. The metadata control circuitry 196 may change and update a physical address corresponding to the logical address after the data is migrated from the random data block 60_1 to the classified data block 60_2.

Through the above-described operations, data stored in the random data block 60_1 may be individually migrated into the classified data block 60_2 according to its data attribute. The classified data block 60_2 may include at least one block corresponding to each of the data attributes. For example, regarding a data temperature in the data attribute, the classified data block 60_2 may include a memory block in which hot data is stored, a memory block in which warm data is stored, and a memory block in which cold data is stored. Regarding the data lifetime of the data attribute, the classified data block 60_2 may include a block in which long data is stored and a block in which short data is stored.

According to an embodiment, in consideration of the data temperature and the data lifetime, the classified data block 60_2 can include a block in which hot and long data are stored, a block in which hot and short data are stored, a block in which warm and long data are stored, a block in which warm and short data is stored, a block in which cold and long data are stored, and a block in which cold and short data are stored. The memory device 150 may include a plurality of non-volatile memory cells. The plurality of non-volatile memory cells may have different operational properties or characteristics (e.g., data read/write speed, cell lifetime, retention, etc.). The properties or characteristics may be different depending on structure and characteristics of the non-volatile memory cells. The memory device 150 may include a plurality of memory blocks. The plurality of memory blocks of memory device 150 may have different operational states (e.g., read count, program/erase (P/E) count, etc.). Accordingly, the controller 130 may reflect operational characteristics and states of the respective memory blocks in the memory device 150 to determine which memory block is allocated for each of data attributes. Details will be described later.

According to an embodiment, the data migration from the random data block 60_1 to the classified data block 60_2 may be performed while the memory system 110 does not receive a command or an instruction relevant to data input/output from an external device. The data migration from the random data block 60_1 to the classified data block 60_2 may be technically distinguished from a conventional garbage collection. The garbage collection is an operation for moving valid data in a specific block to a free block regardless of data attributes. On the other hand, the data migration includes an operation of migrating data stored in the random data block 60_1 into the classified data block 60_2 according to an attribute of the data.

In an embodiment, invalid data in the random data block 60_1 through the data migration may not be moved to the classified data block 60_2. In another example, valid or invalid data in the classified data block 60_2 may be controlled through the garbage collection which is separately performed after the data migration. Since each of the classified data blocks 60_2 stores plural data having same or similar data attribute, time and frequency of performing the garbage collection for each block may be different. For example, blocks that store cold and long data may not need to perform the garbage collection often. On the other hand, blocks that store hot and short data may need to perform the garbage collection frequently because it is highly probable that the blocks storing hot and short data includes more invalid data than the blocks storing cold and long data. In the memory system 110 including the classified data block 60_2 capable of storing data according to its data attribute, a scope or a range of the garbage collection may be efficiently selected and limited, so that a time spent for the garbage collection may decrease and operational efficiency may be improved or enhanced.

In addition, in the memory system 110 including the classified data block 60_2 capable of storing data according to its data attribute, efficiency in wear leveling may be increased. The wear-out of memory blocks may be more easily predicted or estimated according to the data attribute of the data stored therein. Also, since the wear-out of each memory block is easily predicted, data attributes assigned to a memory block may be changed corresponding to wear-out of the memory block after the garbage collection, i.e., the memory block is erased and then becomes a free block. By the way of example but not limitation, a memory block previously storing cold and long data may be allocated for hot and short data. By changing the attribute of data stored in a memory block, it is possible to pursue a wear-out balance between a plurality of blocks in the memory device 150.

Figure 2:
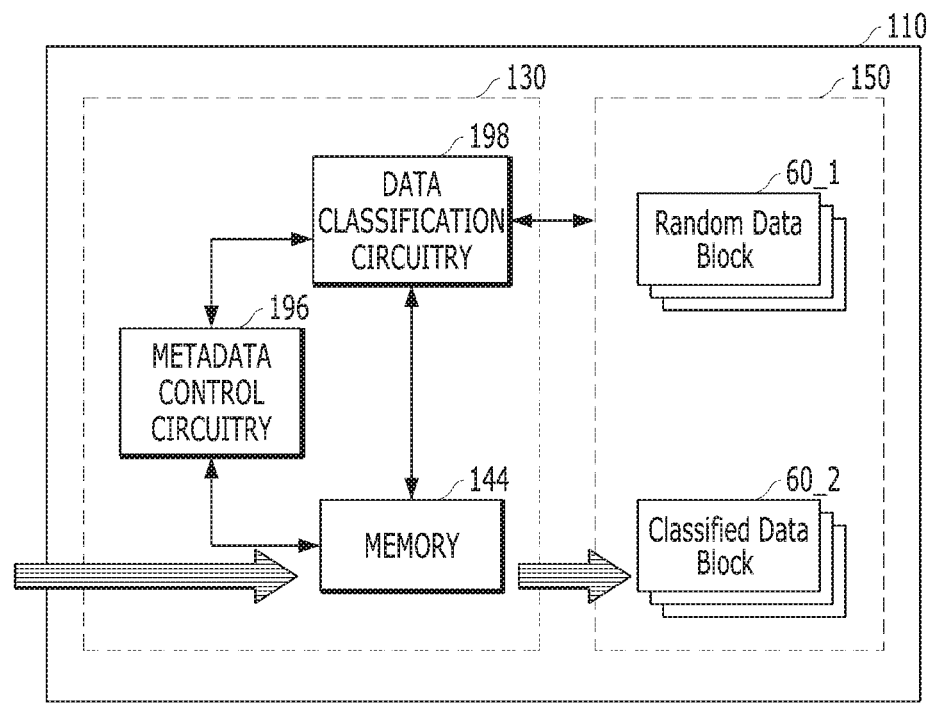
FIG. 2 shows a second example of an apparatus capable of classifying data stored in a memory system in accordance with an embodiment of the disclosure.

FIG. 2 illustrates a second example of an apparatus capable of classifying data in a memory system according to an embodiment of the disclosure. In the second example illustrated in FIG. 2, differences from the first example described in FIG. 1 will be mainly described.

Referring to FIG. 2, the controller 130 may store the data received from an external device in the memory 144 and determine a data attribute of the received data. When determining the data attribute of the data, the controller 130 may store the data temporarily stored in the memory 144 in the classified data block 60_2 corresponding to its data attribute.

Unlike the example described in FIG. 1, when the controller 130 may recognize a parameter corresponding to a logical address, data corresponding to the logical address may not be necessary to be stored in the random data block 60_1 but be directly stored in the classified data block 60_2. For example, when data is received with a specific logical address "LBA010", the data classification circuitry 198 may check a parameter (e.g., read count, etc.) corresponding to the logical address "LBA010," which is controlled by the metadata control circuitry 196. When the data attribute is warm and short as a result of checking the parameter corresponding to the logical address "LBA010", the controller 130 may store the data into the classified data block 60_2 allocated for storing warm and short data.

Referring to FIGS. 1 and 2, the controller 130 may determine data attributes of data stored in the memory device 150 or externally received data. The data attribute may be determined based on a change in the parameter corresponding to the logical address for a predetermined interval. The attribute of data stored in the memory device 150 may not be changed constantly or may be changed at any time. For example, when the data stored in the memory device 150 is regularly used by a user or an apparatus engaged with the memory system 110, the attribute of the data may not vary. When data is used intermittently by a user or an apparatus that engaged with the memory system 110, the attribute of the data may vary depending on a timing of when a data attribute is determined.

According to an embodiment, the controller 130 may determine a data attribute for each data while the controller 130 does not perform a data input/output operation. Depending on an embodiment, the data attribute of the data stored in the random data block 60_1 as well as the data attribute of the data stored in the classified data block 60_2 may be re-estimated. By the way of example but not limitation, if a data attribute has been determined at a first timing, the data attribute may be estimated again at a second timing at which the memory system 110 may perform a background operation a predetermined time after the first timing. In response to the change of the parameter corresponding to the logical address between the first and second timings, the controller 130 may determine or adjust the data attribute at the second timing. Accordingly, even though a data temperature corresponding to a specific logical address is hot at the first timing, the data temperature may be changed to warm at the second timing. When newly determined data attribute is different from the previous one, the controller 130 may migrate the corresponding data to a memory block allocated for the changed data attribute.

If data is migrated whenever its data attribute is changed, data migration within the memory system 110 may occur excessively or frequently. Therefore, according to an embodiment, even if the data attribute corresponding to the specific logical address is changed, the controller 130 migrates the data based on the data attribute only when the data corresponding to the logical address is modified, updated or corrected, so that it is also possible to reduce the number of data migration as a background operation regardless of a data input/output operation. In addition, the data migration according to the change of the data attribute may be differently performed according to operation environment of the memory system 110 or operation states of the memory blocks in the memory device 150.

Figure 3:
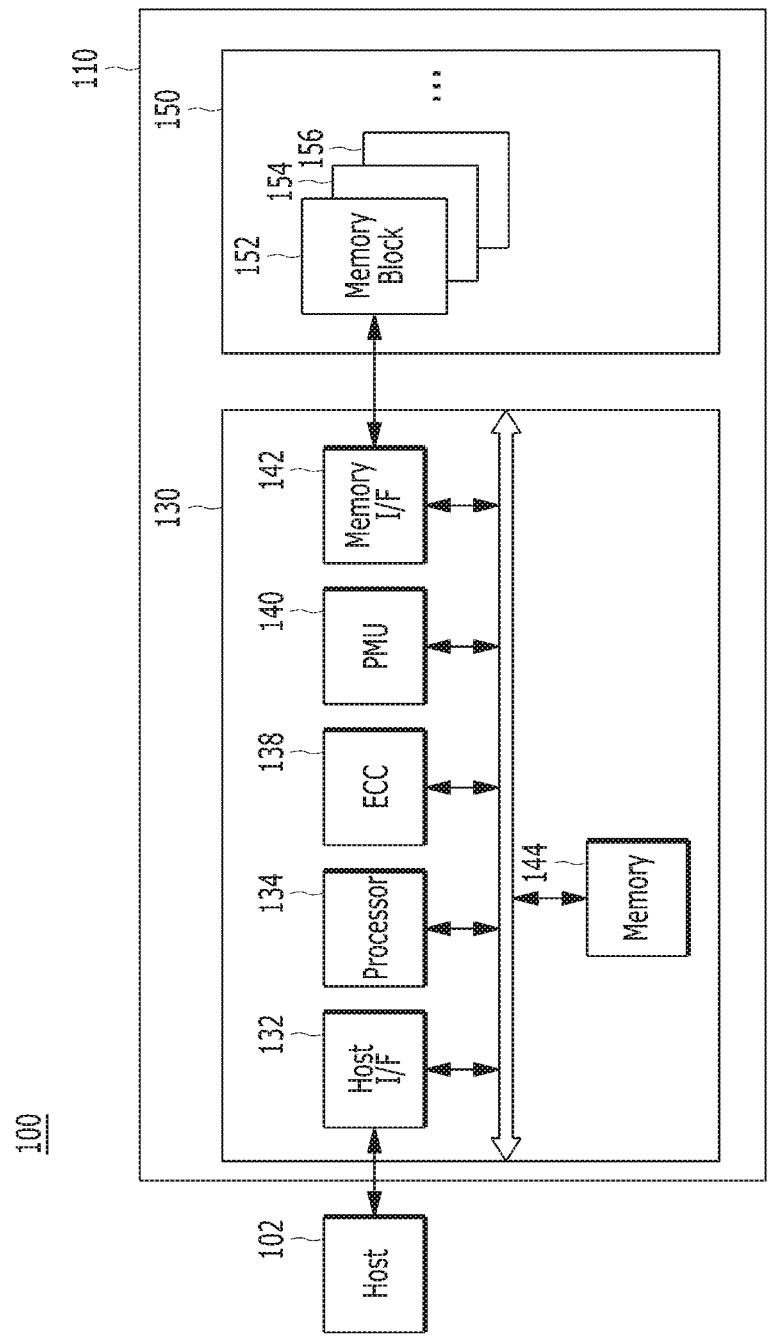
FIG. 3 illustrates a data processing system including a memory system in accordance with an embodiment of the disclosure.

FIG. 3 illustrates a data processing system 100 including a memory system in accordance with an embodiment of the disclosure.

Referring to FIG. 3, the data processing system 100 may include a host 102 engaged or operably coupled with a memory system 110.

The host 102 may include, for example, any of a variety of portable electronic devices, such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS can provide interoperability between the host 102 engaged with the memory system 110 and the user of the memory system 110. The OS may support functions and operations corresponding to user's requests. By way of example but not limitation, the OS may include a general operating system and a mobile operating system according to mobility of the host 102. The general operating system may be split into a personal operating system and an enterprise operating system according to system requirements or user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described below with reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 may be so integrated to form an SSD for improving operation speed. When the memory system 110 is used as an SSD, the operating speed of the host 102 connected to the memory system 110 may be improved more than that of the host 102 connected with a hard disk. In another embodiment, the controller 130 and the memory device 150 may be integrated into one semiconductor device to form a memory card, such as a PC card (PCMCIA), a compact flash card (CF), a smart media card (e.g., SM, SMC), a memory stick, a multimedia card (e.g., MMC, RS-MMC, MMCmicro), a secure digital (SD) card (e.g., SD, miniSD, microSD, SDHC), or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes memory blocks, among the plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through firmware called a host interface layer (HIL).

The ECC component 138 may correct error bits of the data to be processed in (e.g., outputted from) the memory device 150, which may include an ECC encoder and an ECC decoder. Here, the ECC encoder may perform error correction encoding of data to be programmed in the memory device 150 to generate encoded data into which a parity bit is added and store the encoded data in memory device 150. The ECC decoder may detect and correct errors contained in a data read from the memory device 150 when the controller 130 reads the data stored in the memory device 150. In other words, after performing error correction decoding on the data read from the memory device 150, the ECC component 138 may determine whether the error correction decoding has succeeded and output an instruction signal (e.g., a correction success signal or a correction fail signal). The ECC component 138 may use the parity bit which is generated during the ECC encoding process, for correcting the error bit of the read data. When the number of the error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include all or some of circuits, modules, systems or devices for performing the error correction operation based on at least one of the above described codes.

The PMU 140 may manage an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through firmware called a Flash Interface Layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data required for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 3 exemplifies the memory 144 disposed within the controller 130, the present invention is not limited to that arrangement. That is, the memory 144 may be within or externally to the controller 130. For instance, the memory 144 may be embodied by an external volatile memory having a memory interface transferring data and/or signals between the memory 144 and the controller 130.

The memory 144 may store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 may control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may serve as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may otherwise function as a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the particular page to the newly programed page) due to a characteristic of a flash memory device. Further, the controller 130 may store map data of the new data into the FTL.

When performing an operation requested from the host 102 in the memory device 150, the controller 130 uses the processor 134. The processor 134 may handle instructions or commands corresponding to a command received from the host 102. The controller 130 may perform a foreground operation as a command operation, corresponding to an command received from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation includes an operation of copying and storing data in a memory block, among the memory blocks 152, 154, 156 in the memory device 150, to another memory block (e.g., a garbage collection (GC) operation). The background operation may include an operation to move or swap data stored in at least one of the memory blocks 152, 154, 156 in the memory device 150, into at least another of the memory blocks 152, 154, 156 (e.g., a wear leveling (WL) operation). During a background operation, the controller 130 may use the processor 134 for storing the map data stored in the controller 130 to at least one of the memory blocks 152, 154, 156, e.g., a map flush operation. A bad block management operation of checking for bad blocks among the plurality of memory blocks 152, 154, 156 is another example of a background operation performed by the processor 134.

According to an embodiment, the metadata control circuitry 196 and the data classification circuitry 198 described in FIGS. 1 and 2 are implemented through at least one processor 134 and at least one memory 144 in the controller 130 described in FIG. 3. For example, when the metadata control circuitry 196 and the data classification circuitry 198 are implemented as firmware, the controller 130 loads the firmware stored in the memory device 150 into the memory 144 and then the loaded firmware may be executed by the processor 134.

In the memory system 110, the controller 130 performs a plurality of command operations corresponding to a plurality of commands received from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 may determine which channel(s) or way(s) for connecting the controller 130 to which memory die(s) in the memory 150 is/are proper or appropriate for performing each operation. The controller 130 may transmit data or instructions via determined the channel(s) or way(s) for performing each operation. The plurality of memory dies may transmit an operation result via the same channel(s) or way(s), respectively, after each operation is completed. Then, the controller 130 may transmit a response or an acknowledge signal to the host 102. In an embodiment, the controller 130 may check a status of each channel or each way. In response to a command received from the host 102, the controller 130 may select at least one channel or way based on the status of each channel or each way so that instructions and/or operation results with data may be delivered via selected channel(s) or way(s).

By way of example but not limitation, the controller 130 may recognize statuses regarding channels (or ways) associated with memory dies in the memory device 150. The controller 130 may determine each channel or each way as being in a busy state, a ready state, an active state, an idle state, a normal state, or an abnormal state. The controller 130 may determine which channel or way an instruction (and/or a data) is delivered through, based on a physical block address, e.g., to which die(s) the instruction (and/or the data) is delivered. The controller 130 may refer to descriptors delivered from the memory device 150. The descriptors may include a block or a page of parameters that describe informative items about the memory device 150, which is data with a set format or structure. For instance, the descriptors may include device descriptors, configuration descriptors, unit descriptors, and the like. The controller 130 may refer to, or use, the descriptors to determine with which channel(s) or way(s) an instruction or a data is exchanged.

A management unit (not shown) may be included in the processor 134. The management unit may perform bad block management of the memory device 150. The management unit may find bad memory blocks, which are in unsatisfactory condition for further use, as well as perform bad block management on the bad memory blocks. When the memory device 150 is a flash memory, for example, a NAND flash memory, a program failure may occur during the write operation (or the program operation), due to characteristics of a NAND logic function. During the bad block management, the data of the program-failed memory block or the bad memory block may be programmed into a new memory block. The bad blocks may seriously aggravate the utilization efficiency of the memory device 150 having a three dimensional (3D) stack structure and the reliability of the memory system 110. Thus, reliable bad block management may enhance or improve performance of the memory system 110.

Figure 4:
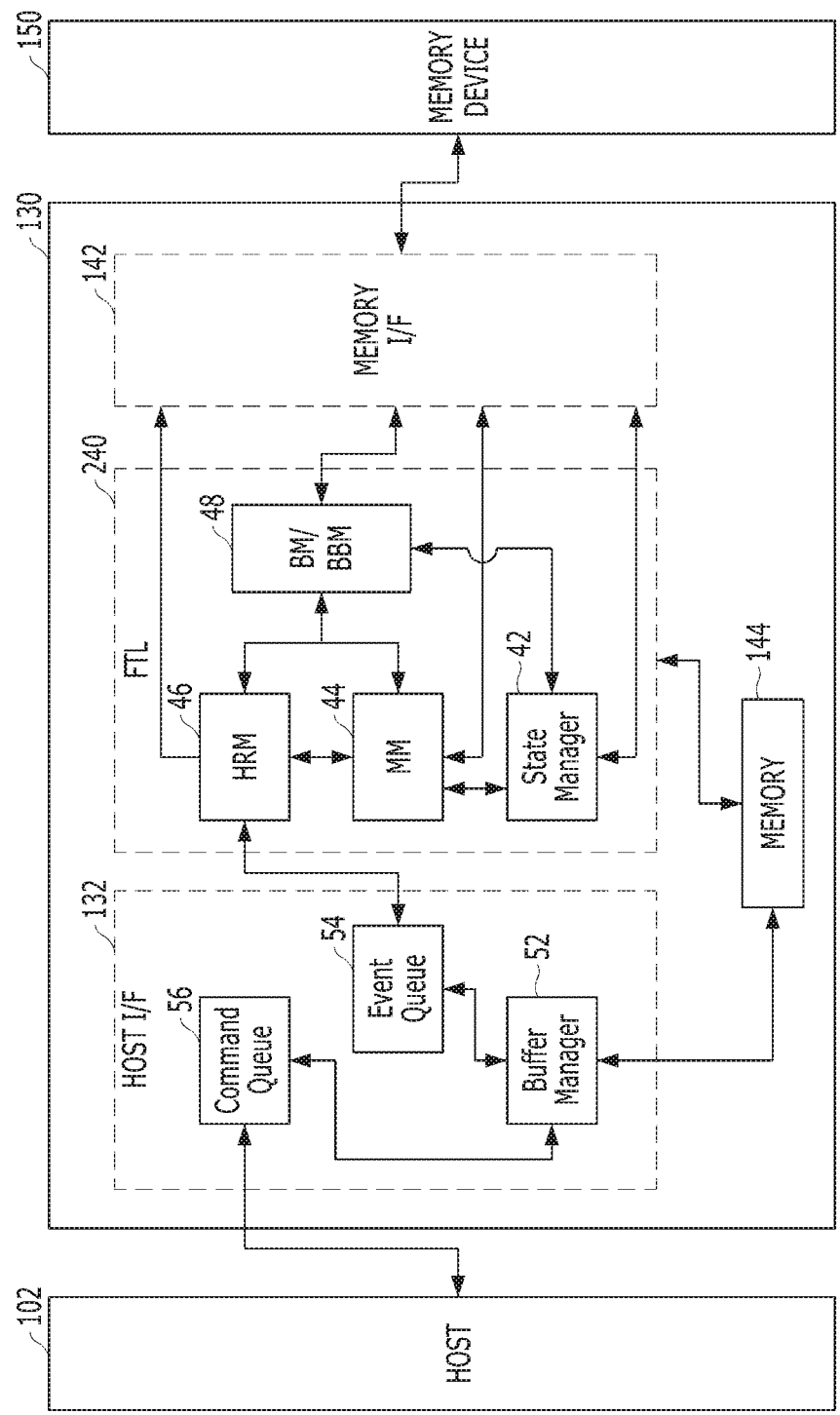
FIG. 4 shows a controller of a memory system in accordance with an embodiment of the disclosure.

FIG. 4 shows a controller 130 of a memory system in accordance with an embodiment of the disclosure.

Referring to FIG. 4, the controller 130 in a memory system in accordance with another example of the disclosure is described in detail. The controller 130 cooperates with the host 102 and the memory device 150. The controller 130 may include a host interface (I/F) 132, a flash translation layer (FTL) component 240, a memory interface (I/F) 142 and a memory 144.

Although not shown in FIG. 4, the ECC component 138 of FIG. 3 may be included in the flash translation layer component 240. In another embodiment, the ECC component 138 may be implemented as a separate module, a circuit, firmware or the like, which is included in, or associated with, the controller 130.

The host interface 132 may handle commands, data, and the like received from the host 102. By way of example but not limitation, the host interface 132 may include a buffer manager 52, an event queue 54 and a command queue 56. The command queue 56 may sequentially store commands, data, and the like received from the host 102 and output them to the buffer manager 52 in the stored order. The buffer manager 52 may classify, manage or adjust the commands, the data, and the like, which are delivered from the command queue 56. The event queue 54 may sequentially transmit events for processing the commands, the data, and the like received from the buffer manager 52.

A plurality of commands and/or data of the same characteristic may be continuously received from the host 102. Alternatively, a plurality of commands and/or data of different characteristics may be received from the host 102, after being mixed or jumbled. For example, the host 102 may transmit a plurality of commands for reading data (i.e., read commands). For another example, the host 102 may alternatively transmit commands for reading data (i.e., read command) and programming/writing data (i.e., write command). The host interface 132 may store commands, data, and the like, which are received from the host 102, to the command queue 56 sequentially. Thereafter, the host interface 132 may estimate or predict what kind of internal operation the controller 130 will perform according to the characteristics of the command and data, which is received from the host 102. The host interface 132 may determine a processing order and a priority of commands and data, based at least on their characteristics. According to characteristics of commands and data, the buffer manager 52 of the host interface 132 is configured to determine whether the buffer manager 52 should store commands and data in the memory 144, or whether the buffer manager 52 should deliver the commands and the data into the flash translation layer component 240. The event queue 54 receives events, entered from the buffer manager 52, which are to be internally executed and processed by the memory system 110 or the controller 130 in response to the commands and the data, so as to deliver the events into the flash translation layer component 240 in the order received.

In accordance with an embodiment, the flash translation layer component 240 may include a state manager 42, a map manager (MM) 44, a host request manager (HRM) 46, and a block manager (BM or BBM) 48. The host request manager 46 may manage the events entered from the event queue 54. The map manager 44 may handle or control map data. The state manager 42 may perform garbage collection or wear leveling. The block manager 48 may execute commands or instructions onto a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry request to the map data manager 44, to determine a physical address corresponding to the logical address which is entered with the events. The host request manager 46 may send a read request with the physical address to the memory interface 142, to process the read request (or handle the events). On the other hand, the host request manager 46 may send a program request (or write request) to the block manager 48, to program entered data to an empty page (having no data) in the memory device 150. Then, the host request manager 46 may transmit a map update request corresponding to the program request to the map manager 44, to update an item relevant to the programmed data in information of mapping the logical-to-physical addresses to each other.

The block manager 48 may convert a program request delivered from the host request manager 46, the map data manager 44, and/or the state manager 42 into a flash program request used for the memory device 150, to manage flash blocks in the memory device 150. In order to maximize or enhance program or write performance of the memory system 110 of FIG. 2, the block manager 48 may collect program requests and send flash program requests for multiple-plane and one-shot program operations to the memory interface 142. The block manager 48 may send several flash program requests to the memory interface 142 to enhance or maximize parallel processing of the multi-channel and multi-directional flash controller (i.e., the memory interface 142).

The block manager 48 may be configured to manage blocks in the memory device 150 according to the number of valid pages. Further, the block manager 48 may select and erase blocks having no valid pages when a free block is needed, and select a block including the least number of valid pages when it is determined that garbage collection is necessary. The state manager 42 may perform garbage collection to move the valid data to an empty block and erase remaining data in the blocks from which the valid data was moved so that the block manager 48 may have enough free blocks (i.e., empty blocks with no data). If the block manager 48 provides information regarding a block to be erased to the state manager 42, the state manager 42 is able to check all flash pages of the block to be erased to determine whether each page is valid. For example, to determine validity of each page, the state manager 42 may identify a logical address stored in an area (e.g., an out-of-band (OOB) area) of each page. To determine whether each page is valid, the state manager 42 may compare the physical address of the page with the physical address mapped to the logical address obtained from the request. The state manager 42 sends a program request to the block manager 48 for each valid page. A mapping table may be updated through the update of the map manager 44 when the program operation is completed.

The map manager 44 may manage a logical-to-physical mapping table. The map manager 44 may process requests such as queries, updates, and the like, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made, and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) has not been completed, the map manager 44 may not perform the mapping table update. This is because the map request is issued with old physical information if the state manger 42 requests a map update and a valid page copy is not completed until later. The map manager 44 may perform a map update operation to ensure accuracy only if the latest map table still points to the old physical address.

In accordance with an embodiment, at least one of the state manager 42, the map manager 44 or the block manager 48 may include the metadata control circuitry 196 and the data classification circuitry 198 shown in FIG. 1.

The memory device 150 may include a plurality of memory blocks. The plurality of memory blocks may be different types of memory blocks, such as a single level cell (SLC) memory block or a multi level cell (MLC) memory block, according to the number of bits that can be stored or represented in one memory cell of such block. The SLC memory block includes a plurality of pages implemented by memory cells, each storing one bit of data. The SLC memory block may have high data input and output (I/O) operation performance and high durability. The MLC memory block includes a plurality of pages implemented by memory cells, each storing multi-bit data (e.g., two bits or more). The MLC memory block may have a larger storage capacity for the same space compared to the SLC memory block. The MLC memory block may be highly integrated in terms of storage capacity. In an embodiment, the memory device 150 may be implemented with MLC memory blocks, such as a double level cell memory block, a triple level cell (TLC) memory block, a quadruple level cell (QLC) memory block and a combination thereof. The double level memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory, a NOR flash memory and the like. In another embodiment, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

In the case of performing command operations corresponding to a plurality of commands received from the host 102, data corresponding to the command operations are stored in buffers (not shown) included in the memory device 150. For example, in the case of performing program operations, data corresponding to the program operations are stored in the buffers, and are then stored in the pages included in the memory blocks of the memory dies. In the case of performing read operations, data corresponding to the read operations are read from the pages in the memory blocks of the memory dies, are stored in the buffers, and are then provided to the host 102 through the controller 130.

In an embodiment of the disclosure, the buffers in the memory device 150 are disposed externally to their respective memory dies. In another embodiment, the buffers may be disposed within their respective memory dies. Moreover, the buffers may correspond to their respective planes or their respective memory blocks in their respective memory dies. Further, in an embodiment of the disclosure, the buffers in the memory device 150 are the plurality of page buffers in the memory device 150. In another embodiment, the buffers may be a plurality of caches or a plurality of registers included in the memory device 150.

The plurality of memory blocks in the memory device 150 may be grouped into a plurality of super memory blocks, and command operations may be performed in the plurality of super memory blocks. Each of the super memory blocks may include a group of the plurality of memory blocks. For example, memory blocks in a first memory block group may form a first super memory block, and memory blocks in a second memory block group may form a second super memory block. In this regard, in the case where the first memory block group is included in the first plane of a first memory die, the second memory block group may be included in the first plane of the first memory die, may be included in the second plane of the first memory die or may be included in the planes of a second memory die.

In an embodiment of the disclosure, a data processing system may include plural memory systems. Each of the plural memory systems 110 may include the controller 130 and the memory device 150. In the data processing system, one of the plural memory systems 110 may be a master and each of the others may be a slave. For example, the master may be determined based on contention (e.g., arbitration and conflict avoidance, or competition for resources) between the plural memory systems 110. When a plurality of commands is delivered from the host 102 in the data processing system, the master may determine a destination of each command based at least on statuses of channels or buses. For example, a first memory system may be determined as a master memory system among a plurality of memory systems, corresponding to information (e.g., operational status) delivered from the plurality of memory systems. If the first memory system is determined as the master memory system, the remaining memory systems are considered slave memory systems. A controller of the master memory system may check statuses of a plurality of channels (or ways, buses) coupled to a plurality of memory systems to select which memory system handles commands or data delivered from the host 102. In an embodiment, the master memory system may be dynamically determined among the plural memory systems. In another embodiment, the master memory system, among the plurality of memory systems, may be changed periodically or according to an event. That is, the current master memory system may later become a slave memory system, and one of the slave memory systems may become the master memory system.

Hereinafter, a method and an apparatus for transferring data in the memory system 110 including the memory system 150 and the controller 130 described above will be described in more detail. As the amount of data stored in the memory system 110 becomes larger, the memory system 110 may be required to read or store large amounts of data at a time. However, a read time for reading data stored in the memory device 150 or a program/write time for writing data in the memory device 150 may be generally longer than a handling time for the controller 130 to process data or a data transmission time between the controller 130 and the memory system 150. For example, the read time might be twice that of the handling time. Since the read time or the program time is significantly longer than the handling time or the data transmission time, a procedure or a process for delivering data in the memory system 110 may affect performance of the memory system 110, e.g., operation speed, and/or structure of the memory system 110 such as a buffer size.

Figure 5:
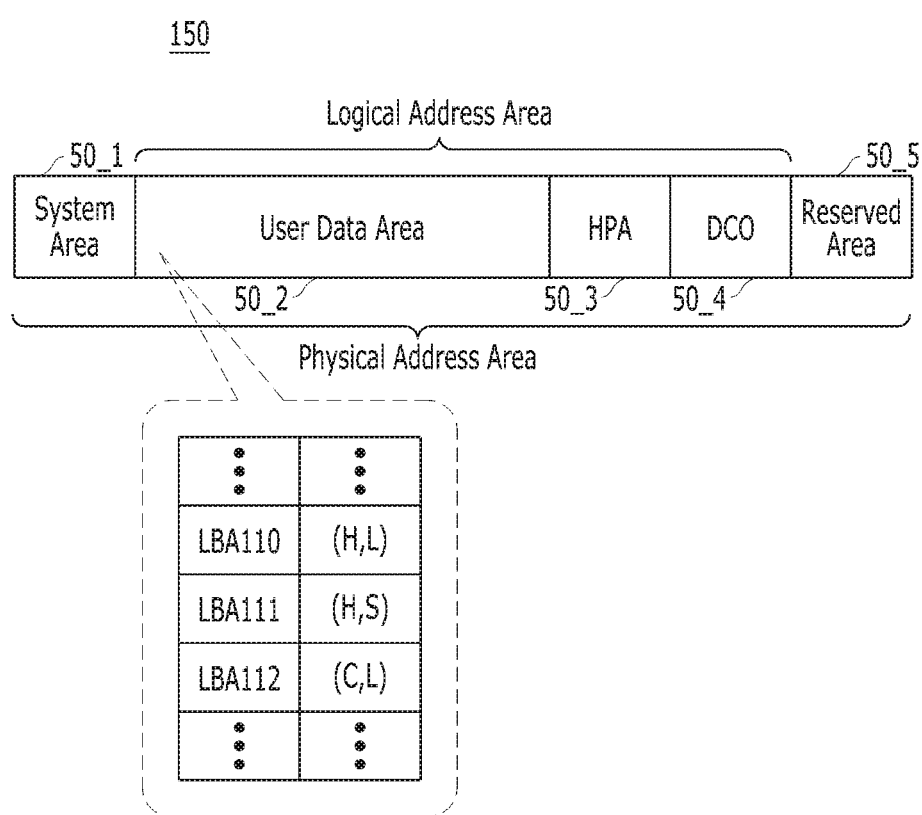
FIG. 5 illustrates an example of determining an attribute of data corresponding to a logical address in a memory system according to an embodiment of the disclosure.

FIG. 5 illustrates an example of determining a data attribute corresponding to a logical address in a memory system according to an embodiment of the disclosure. FIG. 5 illustrates the memory device 150 described in FIGS. 1 to 4 with the concept of a logical storage device rather than a physical component.

Referring to FIG. 5, the memory device 150 may include a system area 50_1, a user data area 50_2, and a reserved area 50_5.

Specifically, the system area 50_1 is a region including a firmware block, a firmware copy block, and the like. The system area 50_1 is a physical address area accessible using a physical address only, such as a physical block address of the memory device 150, not a logical address used by a computing device or a host. Thus, even if the memory system including the memory device 150 is associated with the computing device, the user may not be able to access the system area 50_1 via the computing device. The system area 50_1 may have limited access. That is, it may only be accessed by a special instruction or a program. The system area 50_1 may store basic information for recognizing hardware configuration in the memory system 110 or the memory device 150, firmware for supporting basic operations of the memory system 110, and the like.

The user data area 50_2 may store user data or the like to be transmitted from/to a computing device with which the memory system is associated. Representative data to be stored in the user data area 50_2 may include an operating system (OS), file system information, an application program, or the like.

The user data area 50_2 is a logical address area that may be accessed using a logical address such as a logical block address or the like. For example, a logical block address (LBA), which is used in a logical block addressing method, may be in a format used for a computing device or a host to specify a location of data stored in a storage device. In the case of a conventional hard disk, an addressing method indicating a physical structure in a hard disk, such as a cylinder, a head, and a sector (a Cylinder-Head-Sector, CHS) was used. However, the addressing method corresponding to the physical structure of the hard disk has reached the limit as the storage capacity of the hard disk increases. In such a large-capacity storage device, the address may be specified in a manner that plural sectors are arranged in a logical sequence in a row, and the plural sectors are numbered (for example, in order from 0), regardless of the physical structure of the hard disk. While a computing device (e.g., the host 102 of FIGS. 3 and 4) may transfer or point a piece of data with a logical block address (LBA), the memory system 110 should match and manage computing device's logical block address with a physical location such as a physical address, which can indicate an actual location at which the data is stored in the memory device 150. Such information for associating a logical address with a physical address may be included in metadata or map data, which may be distinguishable from a piece of user data stored or read through the host 102.

The reserved area 50_5 may be used to store information for an operation with a computing device or another system which is associated with the memory system, or may be used for other configuration embedded in the memory system, in accordance with an embodiment. For example, the reserved area 50_5 may store an error correction code (ECC) for the ECC component 138.

Like the system area 50_1, the reserved area 50_5 is a physical address area accessible by a physical address only such as a physical block address. The memory system 110 stores data used for supporting plural operations required or necessary for a manufacturing process, a process of being configured or mounted on the host 102 or a computing device or an operation engaged or associated with the host 102 or a computing device, in the reserved area 50_5. While the system area 50_1 is used to support the basic operation of the memory system 110, the reserved area 50_5 may be used to extend operation(s) supported by the memory system.

In accordance with an embodiment, the memory device 150 may include at least one of a host protection area (HPA) 50_3 and a device configuration overlay (DCO) 50_4. The host protection area (HPA) 50_3 may be an area supported by the Advanced Technology Attachment (ATA)-4 standard. The device configuration overlay (DCO) 50_4 may be an area supported by the ATA-6 standard. The ATA may include a standard technology of an interface used in a laptop or desktop computer, and may be referred to as an Integrated Device Environment (IDE) or Enhanced IDE (EIDE) method.

The host protection area (HPA) 50_3 may be used mainly for a BIOS diagnostic utility, a system boot, and a system recovery. For example, the host protection area (HPA) 50_3 may not be accessible via the BIOS of the host 102. That is, it may be an area of the memory system that is not visible or open to the operating system (OS) and is not modified usually by a user. The host protection area (HPA) 50_3 may support a system recovery without a separate medium such as CD or DVD.

The device configuration overlay (DCO) 50_4 may be used by the memory system manufacturer to adjust the disk size. For example, a manufacturer may have storage capacities of 300 GB, 500 GB, 750 GB, and/or 1 TB, depending on a model of the memory system. The device configuration overlay (DCO) 50_4 may be made to look like a memory system made in several sizes, such as 60 GB, 100 GB, 200 GB, 500 GB, or 1 TB, even though the memory system has been not differently manufactured depending on its storage capacity. The device configuration overlay (DCO) 50_4 may also be inaccessible via the BIOS of the host 102, but may be accessible through special commands defined by the manufacturer of the memory system 110.

Although not shown, in accordance with an embodiment, the memory device 150 may support an IDE or EIDE scheme as well as Small Computer System Interface (SCSI) scheme. The areas in the memory device 150 may be allocated or allocated differently depending on a configuration or an operation method supported by the memory system 110.

Data stored in the user data area 50_2 may correspond to each logical block address (LBA). A data attribute of each data may be determined based on parameters corresponding to each logical block address (LBA). For example, a data attribute may be determined by a data temperature and a data lifetime. By the way of example but not limitation, data corresponding to a first logical address LBA110 may have a data attribute of hot (H) and long (L), and data corresponding to a second logical address LBA111 may have a data attribute of hot (H) and short (S). Data corresponding to a third logical address LBA112 may have the data attribute of cold (C) and long (L). The data corresponding to the first to third logical addresses LBA110 to LBA112 may be stored not sequentially in the memory device 150 (e.g., the order of the logical address). The data corresponding to the first to third logical addresses LBA110 to LBA112 may be stored according to their data attributes. Therefore, since the data corresponding to the first to third logical addresses LBA110 to LBA112 have different data attributes, the data may be stored in different memory blocks allocated for different data attributes.

Figure 6:
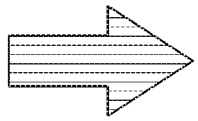
FIG. 6 illustrates an example of data migration according to attributes of data stored in a memory system according to an embodiment of the disclosure.

FIG. 6 illustrates an example of data migration according to data attributes in a memory system according to an embodiment of the disclosure.

Referring to FIG. 6, a data attribute may be included in a map information item that is generally used to match a logical address with a physical address. For example, physical addresses (e.g., BLK047, BLK100, BLK066, BLK040, BLK804, BLK420, BLK066, BLK540) may be mapped to logical addresses (e.g., LBA110, LBA111, LBA112, LBA113, LBA114, LBA115, LBA116, LBA117). Data attributes according to a data temperature and a data lifetime may be mapped to each of the logical addresses (e.g., LBA110, LBA111, LBA112, LBA113, LBA114, LBA115, LBA116, LBA117).

The map information item in FIG. 6 shows how to migrate data according to a data attribute corresponding to a logical block address. For example, two pieces of data corresponding to two logical addresses LBA112, LBA116 have different data attributes (C, L), (H, S), but the two pieces of data are stored in the same memory block (physical address BLK066), before the data migration. After the data migration, plural data are moved according to their data attribute. Referring to FIG. 6, there are three movements ①, ②, ③ for data migration according to the data attributes.

The first data movement ① shows that data corresponding to a logical block address LBA112 has been moved from a previous memory block BLK066 into a current memory block BLK606 which is allocated for the data attribute of the cold (C) and long (L).

The second data movement ② shows that data corresponding to a logical block address LBA115 has been moved into a previous memory block BLK047 allocated for the data attribute of hot (H) and long (L) from a previous memory block BLK420. Due to the same data attribute (i.e., hot (H) and long (L)), two pieces of data associated with logical block addresses LBA110, LBA115 may be stored in the same memory block BLK047 through the second data movement ②. According to an embodiment, the number of memory blocks allocated for a specific data attributes (e.g., hot (H) and long (L)) may be plural, and data of logical block addresses LBA110, LBA115 may be individually allocated to one of the plurality of memory blocks allocated for specific data attributes.

The third data movement ③ show that data corresponding to a logical block address LBA 113 has been moved from a previous memory block BLK040 to a current memory block BLK066 assigned for the data attribute of hot (H) and short (S). Two pieces of data corresponding to the logical block addresses LBA113, LBA116 having the same data attribute (hot (H) and short (S)) may be stored in the same memory block BLK040 through the third data movement ③.

FIG. 7 illustrates an example of assigning blocks according to data attributes in a memory system according to an embodiment of the disclosure.

Referring to FIG. 7, the memory device 150 may include a plurality of memory dies including a first memory die Die0, and a second memory die Die1. Each die Die0, Die1 may include a plurality of memory blocks including a block BLK0 to a block BLK7.

Each die Die0, Die1 may include at least one block assigned to each of various data attributes. For example, the memory blocks BLK0 to BLK7 in the first die Die0 may be classified according to each of different data attributes. By the way of example but not limitation, first and sixth blocks BLK0, BLK5 may be a kind of memory block 40_2 allocated for a data attribute of hot and short. Second and third blocks BLK1, BLK2 may be a kind of memory block 40_1 allocated for a data attribute of hot and long. A fourth block BLK3 may be a memory block 40_3 allocated for a data attribute of warm and long. A fifth block BLK4 may be a kind of memory block 40_4 allocated for a data attribute of warm and short. A seventh block BLK6 may be a memory block 40_5 allocated for a data attribute of cold and long. An eighth block BLK7 may be a memory block 40_6 allocated for a data attribute of cold and short. How many memory blocks are allocated to each of the data attributes among all memory blocks in the first memory die Die0 may be determined dynamically based on operation environment (e.g., requirements) of the memory system 110 or an operation state of the memory device 150. In addition, each memory block in the memory device 150 is not fixed to a single data attribute. After becoming a free block through garbage collection or wear leveling operation, a memory block may be allocated for another data attribute which is different and distinguishable from a previous one.

A first block BLK0 in the second die Die1 may be a memory block 40_4 allocated for the data attribute of warm and short. A second block BLK1 may be a memory block 40_2 allocated for the data attribute of hot and short. A fourth block BLK3 may be a memory block 40_5 allocated for the data attributes of cold and long. Fifth and sixth blocks BLK4, BLK5 may be a memory block 40_3 allocated for the data attribute of warm and long. An eighth block BLK7 may be a memory block 40_1 assigned to the data attribute of hot and long. A third block BLK2 and a seventh block BLK6 in the second die Die1 may not be allocated for any data attribute. The third block BLK2 and the seventh block BLK6 shown in dotted lines may be used as the random data block 60_1 described in FIGS. 1 and 2 or considered as the free block.

The controller 130 in FIGS. 1 to 4 may allocate a memory block in the memory device 150 to each of the data attributes, and may store a piece of data in a memory block allocated for its data attribute. According to an embodiment, when a data attribute of data stored in the memory device 150 is changed from one to another, the data may be migrated into another block allocated for the changed data attribute.

Figure 8:
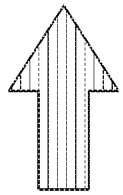
FIG. 8 illustrates a result of data migration according to attributes of data in a memory device according to an embodiment of the disclosure.

FIG. 8 illustrates a result of data migration according to data attributes in a memory system according to an embodiment of the disclosure. The data attributes can include data temperature and data lifetime. The data temperature can be classified into hot (H), cold (C) and warm (W), and the data lifetime can be classified into long (L), short (S) and deletion (Del). Herein, the deletion (Del) may indicate that a piece of data is erased or invalidated so that the piece of data is no longer used.

Referring to FIG. 8, a left side shows a state in which data is not classified corresponding to its data attribute, and a right side shows a state in which data is classified corresponding to its data attribute. Without data classification, plural pieces of data each having a different data attribute are contiguous or mixed in a memory device, regardless of their data attributes. On the other hand, if plural pieces of data are classified or sorted corresponding to their data attribute, data having similar or same data attributes may be placed adjacent to each other. When data stored in the memory device 150 of FIGS. 1 to 4 is classified according to its data attribute as described in FIG. 8, the memory system 110 may improve or increase operation efficiency when performing garbage collection and wear leveling.

In a memory system according to another embodiment, data migration, movement or rearrangement according to data attributes may be performed on a block basis. Plural pieces of data having the same data attribute may be arranged in adjacent blocks. But, plural pieces of data having the same data attribute may be distributed over plural access units that may be split through a channel and a way. For example, data having a data attribute of hot and short may be frequently updated, modified, or changed as well as read frequently. That is, data having a data attribute of hot and short may be transmitted through a channel and a way between the controller 130 of FIGS. 1 through 4) and the memory device 150 of FIGS. 1 through 4) so that data input/output may occur frequently. Therefore, as plural memory blocks for storing data having a data attribute of hot and short are sequentially and alternatively arranged via a plurality of channels and a plurality of ways, the data input/output (I/O) performance of the memory system 100 may be improved.

Hereinafter, which memory block among the plurality of blocks in the memory device 150 is allocated for a data attribute will be described. Specifically, FIGS. 9A to 9C illustrate examples of allocating memory blocks in a memory device according to data attributes.

Figure 9A:
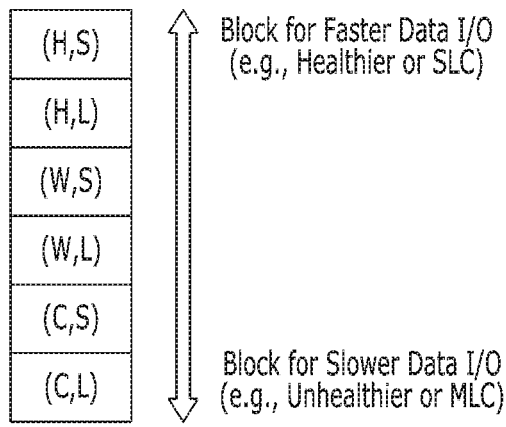
FIGS. 9A to 9C show examples of assigning blocks in a memory device according to attributes of data.
Figure 9B:
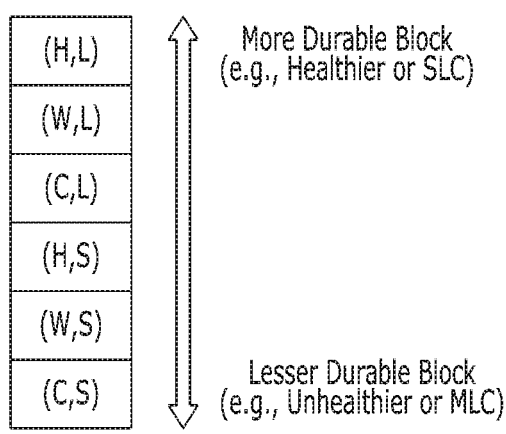
Figure 9C:
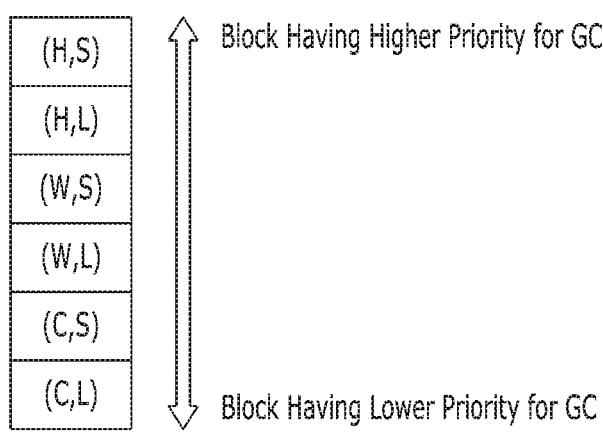

Referring to FIG. 9A, the data attributes may be divided into six types based on a data temperature and a data lifetime. For example, the data attributes include a data attribute of hot (H) and short (S), a data attribute of hot (H) and long (L), a data attribute of warm (W) and short (S), a data attribute of warm (W) and long (L), a data attribute of cold (C) and short (S), and a data attribute of cold (C) and long (L). A memory block may be allocated for storing data having the data attribute of hot (H) and short (S) as a data input/output (Data I/O) speed of the memory block is faster than that of another memory block. Thus, a healthier block in the memory device 150 may be allocated to store data having a data attribute of hot (H) and short (S). In addition, since a memory block including a single-level cell (SLC) capable of storing single-bit data operates at higher speed than a memory block including a multi-level cell (MLC) capable of storing multi-bit data, the memory block including the a single-level cell (SLC) may be allocated to store data having a data attribute of hot (H) and short (S).

On the other hand, even if a memory block allocated for storing data having a data attribute of cold (C) and long (L) may not have a high or great performance, this may not have a great influence on the environment or overall performance of the memory system. Thus, a less healthy memory block, recognized based on an operating state in memory device 150, may be provided to store data having a data attribute of cold (C) and long (L). Further, a memory block including a multi-level cell (MLC) capable of storing multi-bit data corresponding to a plurality of bits, rather than a single-level cell (SLC) capable of storing data corresponding to a single bit, may be allocated for storing data having a data attribute of cold (C) and long (L).

In the memory device 150, operational statuses and internal structures or configurations regarding a plurality of memory blocks may be different or distinguishable. In this case, it might be consistent that a memory block is individually allocated for a data attribute on a basis of data input/output (Data I/O) speed of each memory block. Since the operational status of each block may be changed continuously or dynamically, the controller 130 of FIG. 1 to FIG. 4 may monitor the operational status of each block for allocating the memory block to store data having a different data attribute.

Referring to FIG. 9B, the controller 130 of FIGS. 1 to 4 may determine which memory block is allocated for storing data having different data attributes, in terms of durability, not data I/O speed.

The data attributes may be divided into six types based on a data temperature and a data lifetime. For example, the data attributes include a data attribute of hot (H) and short (S), a data attribute of hot (H) and long (L), a data attribute of warm (W) and long (L), a data attribute of cold (C) and long (L), a data attribute of hot (H) and short(S), a data attribute of warm (W) and short (S), and a data attribute of cold (C) and short (S). A memory block may be allocated for storing data having the data attribute of hot (H) and short (S) as a data input/output (Data I/O) speed of the memory block is faster than that of another memory block. Thus, a healthier block in the memory device 150 may be allocated to store data having a data attribute of hot (H) and short (S). In addition, since a memory block including a single-level cell (SLC) capable of storing single-bit data operates at higher speed than a memory block including a multi-level cell (MLC) capable of storing multi-bit data, the memory block including the a single-level cell (SLC) can be allocated to store data having a data attribute of hot (H) and short (S).

On the other hand, it may not significantly affect the overall performance of the memory system 110 of FIGS. 1 to 4 that a memory block less durable is allocated for storing data having a data attribute of cold (C) and short (S). Thus, a memory block which is determined to be less healthy based on its operational status in memory device 150 may be allocated to store data having the data attribute of cold (C) and short (S). Further, a memory block including a multi-level cell (MLC) capable of storing multi-bit data, rather than a single-level cell (SLC) capable of storing single-bit data, may be provided to store data having a data attribute of cold (C) and short (S).

Since the operational status and configurations of the plurality of blocks in the memory device 150 may be different, which memory block is to be allocated for storing data having a data attribute may be determined based on specific parameters such as an E/R cycle in terms of durability. The operational statuses of each memory block may be continuously changed, so that the controller 130 of FIGS. 1 to 4 may monitor the operational status of each memory block and then re-allocate memory blocks for storing data having a different data attribute.

Referring to FIG. 9C, a data attribute may be used to select a target or victim block for performing garbage collection. For example, the data attributes include a data attribute of hot (H) and short (S), a data attribute of hot (H) and long (L), a data attribute of warm (W) and short (S), a data attribute of warm (W) and long (L), a data attribute of cold (C) and short (S), and a data attribute of cold (C) and long (L).

It is highly possible that a memory block allocated for storing data having a data attribute of hot (H) and short (S) may be determined as a target of garbage collection (i.e., the memory block has a high priority for garbage collection). On the other hand, it is rarely possible that a memory block allocated for storing data having a data attribute of cold (C) and long (L) may be determined as a target of garbage collection (i.e., the memory block has a low priority for garbage collection). By the way of example but not limitation, garbage collection may be performed frequently for a memory block having a higher priority, while garbage collection may be performed infrequently for a memory block having a lower priority.

Referring to FIGS. 9A to 9C, data attributes determined based on the data temperature and data lifetime may have different priorities depending on which operation is performed by or within the memory system 110. By the way of example but not limitation, priorities or weights between data attributes may vary depending on an operation performed by the memory system 110 of FIGS. 1 to 4 such as data input/output, garbage collection during background operation or the like. In FIGS. 9A to 9C, priorities or weights between data attributes in terms of data input/output, durability, or garbage collection are shown. However, according to an embodiment, other operations performed by the memory system 110 may be performed, and priorities or weights between data attributes may be also different.

Figure 10:
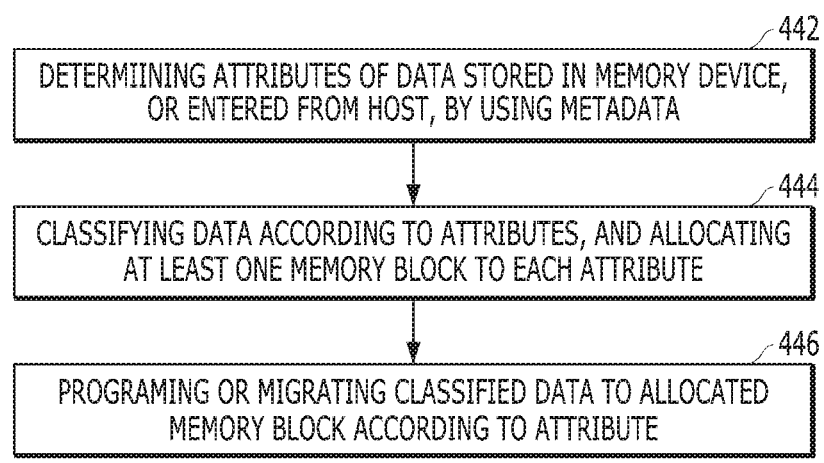
FIG. 10 illustrates a method for classifying and storing data according to attributes of data in a memory system.

FIG. 10 illustrates a method for classifying and storing data according to data attributes in a memory system.

Referring to FIG. 10, a method of operating a memory system may include determining attributes of data stored in a memory device or data received (or entered) from a host based on map information (or metadata) (step 442). In an embodiment, the data attributes may be determined based on a data temperature and a data lifetime. For example, the data temperature may be represented by at least one of frequently accessed (i.e., hot), rarely accessed (i.e., cold), or accessed by a frequency between hot and cold (i.e., warm). Although the data temperature is classified into three types as an example, it may be divided into any number of types according to an embodiment. In addition, the data lifetime may be represented by long or short, which is frequently updated or deleted in a long or short time. Although the data lifetime is described as two types, it may be divided into three or more types according to an embodiment.

The method for operating the memory system may also include classifying data according to data attributes and allocating at least one block within the memory device to each of the data attributes (step 444). The memory device may include a plurality of memory blocks. The plurality of memory blocks may be in different operational statuses. The controller may determine which memory block is allocated for storing data having a specific data attribute in response to the operational status of each of the memory blocks. For example, when a memory device may include plural memory blocks, each including memory cells of different structures, a memory block including a single-level cell (SLC) is allocated for storing data having a data attribute of hot and short. In addition, a healthier block among the blocks in the memory device may be allocated for storing data having a data attribute of hot and short. Whether a memory block is healthier may be determined based on at least one parameter such as a E/W cycle, a read count, an erase count, a write count, or the like regarding the memory block.

The step 442) and the step 444 may be performed either in different orders or simultaneously.

The method for operating the memory system may further include programming or migrating the classified data into an allocated block (step 446). When the data attribute is determined for data to be stored in the memory device, the data having the determined data attribute may be stored or migrated in a memory block allocated for storing data having the corresponding data attribute. Thus, plural pieces of data having the same data attribute may be collected in the at least one memory block allocated for storing data having the corresponding data attribute within the memory device. By storing data having the same data attribute in the memory blocks of the memory device, operational statuses of plural nonvolatile memory cells included in each memory block may be made uniformly. In addition, the memory system may easily infer or estimate the operation status of each memory block according to data attributes. Further, it may be easier for the memory system to perform garbage collection for data stored in each memory block or to perform wear leveling to balance the wear-out of each memory block.

Figure 11:
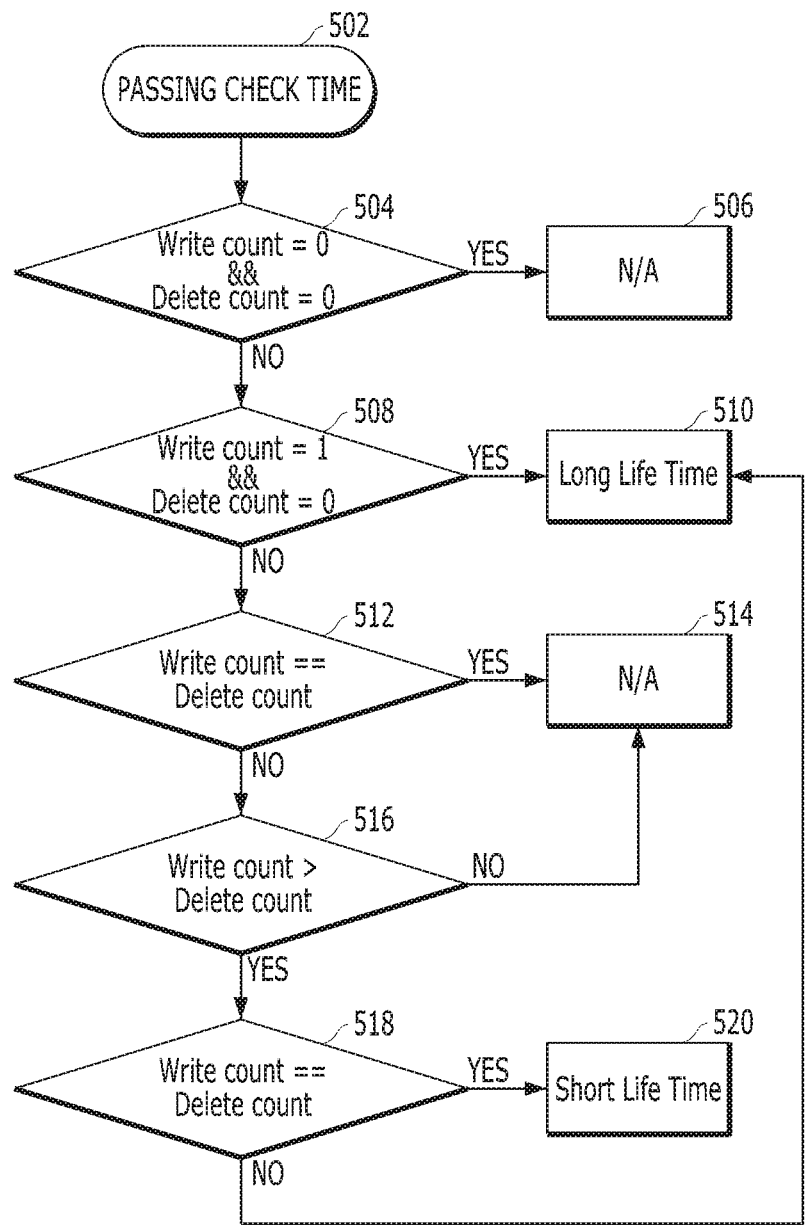
FIG. 11 illustrates a method for determining a data lifetime.

FIG. 11 illustrates a method for determining a data lifetime.

Referring to FIG. 11, the data lifetime of data stored in the memory device may be determined after a preset time or period has passed (step 502). For example, the memory system may perform an operation for determining a data attribute of data stored in the memory device a preset period after data is stored in a memory device or a preset time after the data attribute of data is determined.

When the memory system executes a process for determining the data lifetime, a write count and a delete count or erase count may be checked as parameters corresponding to a logical address. Further, the process for determining the data lifetime may be performed in parallel, along with another operation. For example, while the memory system checks the data lifetime, a step described in FIG. 11 may go off when the parameters may be changed or updated.

First, it may be checked whether both the write count and the delete count corresponding to a specific logical address are 0 (step 504). When both the write count and the delete count corresponding to the specific logical block address are 0 (YES in step 504), it is determined that data corresponding to the specific logical address has not been stored in the memory device for a period that is a criterion used for determining the data lifetime. Since the data is not stored, it is not necessary to determine the data lifetime (step 506).

If both the write count and the delete count corresponding to the specific logical block address are not 0 (NO in step 504), it may check whether the write count corresponding to the logical block address is 1 and the delete count is 0 (step 508). In this case, data corresponding to the logical block address may be stored and then deleted, modified, updated, or changed within the memory device for a time that is a longer than a criterion used for determining the data life. When the write count is 1 and the delete count is 0 (YES in step 508), the data lifetime of data may be determined to be long (step 510).

When a write count corresponding to the specific logical address is 1 and a delete count is not 0 (NO in step 508), it may be checked whether the write count and the delete count corresponding to the specific logical address are identical to each other (step 512). When the write count and the delete count corresponding to the logical address are the same (YES in step 512), data associated with the logical address may be stored and deleted. Since valid data is not stored in the memory device corresponding to the logical address in the current state, it might be not necessary to determine the data lifetime of data associated with the logical address (step 514).

When the write count and the delete count corresponding to the logical address are not the same (NO in step 512), it may be checked whether the write count is greater than the delete count (step 516). When the write count is not greater than the deletion count (NO in step 516), it is determined that valid data corresponding to the logical address is not stored in the memory device, so that it is not necessary to determine the data lifetime of data corresponding to the logical address (step 514).

When the write count is greater than the delete count (YES in step 516), the memory system may check whether a write count and a delete count corresponding to a specific logical address are the same (step 518). When the write count becomes the same as the delete count after the write count is greater than the delete count (YES in step 518), the data lifetime corresponding to the logical address may be considered a short (step 520). On the other hand, if the write count is not equal to the delete count after the write count is greater than the delete count (NO in step 518), the data lifetime corresponding to the logical address may be determined as long (step 510).

According to an embodiment, the operation of determining the data lifetime in FIG. 11 may be performed as a background operation. Alternatively, the operation of determining the data lifetime in FIG. 11 may be performed individually in the process of performing the data input/output operation in the memory system. For example, when the memory system receives an instruction from an external device and the instruction includes a logical address, the memory system may search for map information corresponding to the logical address for performing an operation in response to the instruction and/or update the map information after performing the operation. The data lifetime may be determined based on a parameter corresponding to the logical address. In this case, the data lifetime may be checked in real time, and data externally inputted may be stored in a memory block corresponding to its data attribute in the memory device.

According to an embodiment, while the memory system handles or processes a command transferred from another device or performs a data input/output operation after a preset time or a preset period has elapsed, the process of determining the data lifetime may not be begun but kept in a standby state. When the memory system does not receive a command from an external device, does not perform a data input/output operation, or may perform a background operation, the memory system may start to determine a data lifetime of data which have stored in the memory device.

Figure 12:
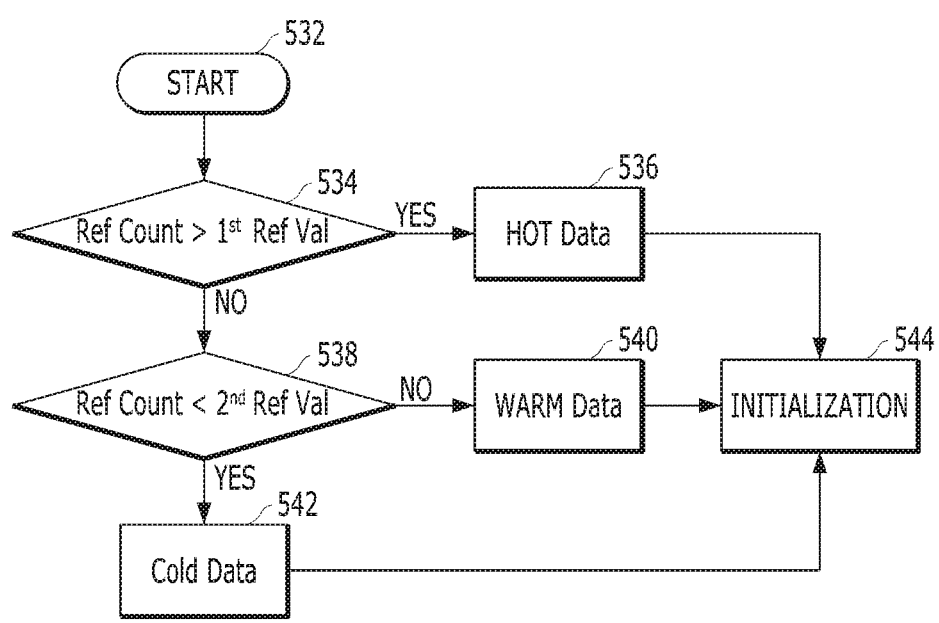
FIG. 12 illustrates a method for determining a data temperature.

FIG. 12 shows a method for determining a data temperature.

Referring to FIG. 12, a process for determining the data temperature, which is executed by the memory system, may be started at a specific timing (step 532). When the data temperature of data is determined, the memory system may initialize the change of parameters used to determine the data temperature (step 544).

In an embodiment, the process of determining the data temperature may be performed at every preset period, like the process of determining the data lifetime described in FIG. 11. In addition, the memory system may perform a process of determining a data temperature as a background operation while performing a data input/output operation, or may perform a process of determining a data temperature when being in an idle state.

According to an embodiment, the process of determining the data temperature may be executed together with the process of determining the data lifetime described in FIG. 11, or may be executed after the process of determining the data lifetime is performed. For example, when it is recognized through the process of determining the data lifetime that data corresponding to the logical address in the memory device is no longer valid (e.g., step 506 or 514 in FIG. 11), the memory system does not have to determine the data temperature of that logical address.

When the process of determining the data temperature is started (step 532), it may be checked whether a reference count (Ref Count) corresponding to a logical address is greater than a first reference change amount (1st Ref Val) (step 534). In an embodiment, a read count may be utilized as the reference count (Ref Count) corresponding to the logical address. In another example, the reference count is determined based on a combination (e.g., arithmetic operation) of plural parameters (e.g., read count, write count, erase count, etc.) corresponding to the logical address. When the reference count (Ref Count) is greater than the first reference change amount (1st Ref Val) (YES in step 534), the data attribute of data corresponding to the logical address may be determined as hot (step 536).

When the reference count (Ref Count) is less than or equal to the first reference change amount (1st Ref Val) (NO in 534), it is determined whether the reference count (Ref Count) is less than a second reference change amount (2nd Ref Val) (Step 538). The second reference change amount (2nd Ref Val) may be a value less than the first reference change amount (1st Ref Val). When the reference count (Ref Count) is less than the second reference change amount (2nd Ref Val), the data attribute of data corresponding to the logical address may be determined as cold (step 542). When the reference count (Ref Count) is greater than or equal to the second reference change amount (2nd Ref Val) and equal to or less than the first reference change amount (1st Ref Val), the data attribute of data corresponding to the logical address may be considered warm (step 540).

When the data attribute is determined as one of hot, warm, or cold based on the reference count (Ref Count) corresponding to a specific logical address (steps 536, 540, 542), the reference count (Ref Count) may be initialized (step 544). Initializing the reference count (Ref Count) might be required because the data attribute corresponding to the logical address may be changeable over time and it might be effective for the memory system to recognize a current data attribute than a data attribute determined through a history or a log. For example, data having a data attribute of hot in the past may become one having a data attribute of cold or warm, and the memory system may store or migrate the data based on a data attribute dynamically changed.

Figure 13:
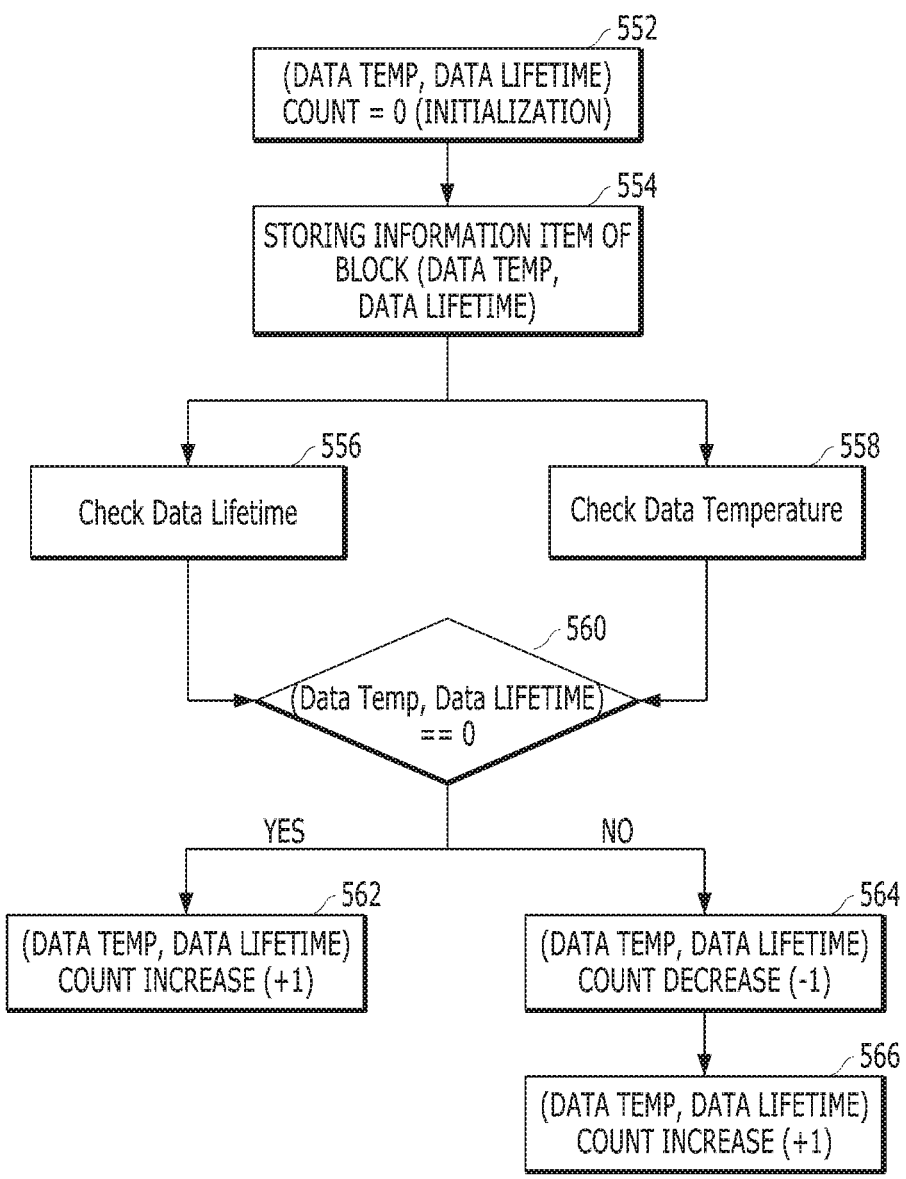
FIG. 13 illustrates a method for determining a count according to attributes of data.

FIG. 13 illustrates a method for controlling a count associated with a data attribute. For example, the count may be used to allow the memory system to more accurately determine the change in data attributes.

Referring to FIG. 13, the data temperature and the data lifetime for the data attribute at an initial timing or a preset timing may be initialized to zero (step 552).

Thereafter, in step 554, a count which is relevant to the data temperature and the data lifetime corresponding to logical address may be stored.

Thereafter, the data lifetime for data corresponding to the logical address may be checked or determined (step 556). In addition, the data temperature data corresponding to the logical address may be determined (step 558).

When the processes of determining the data lifetime and the data temperature regarding data corresponding to the logical address is completed, it may check whether each process has been completed and completed (step 560).

When the processes of determining the data lifetime and the data temperature regarding data corresponding to the logical address is completed (YES in step 560), the count for the data temperature and the data lifetime may be increased by one (step 562).

If the process of determining the data lifetime or the data temperature for data corresponding to the logical address may not be terminated (NO in step 560), the count for the data temperature and the data lifetime corresponding to the logical address may be reduced by one (step 564).

After decreasing the count for the data temperature and data lifetime by one, the memory system may increase the count for the data temperature and data lifetime by one (step 566).

The count described with reference to FIG. 13 may be used for an identifier indicating whether the processes of determining the data life and data temperature for a specific logical block address has been properly performed, the process is being performed, or the process has not been performed. According to an embodiment, when a data attribute of each data may be determined based on two or more different characteristics or properties (e.g., data temperature and data lifetime), a data attribute does not accurately reflect a current status if only one property, not both, is changed. Also, if a data attribute may be changed at any time through a plurality of processes that affect current characteristics or cause different characteristics, the data classification and the data migration may cause an overhead in the operation of the memory system. Thus, according to an embodiment, the count is used to check whether a plurality of processes for detecting different features have been performed normally, the memory system may determine data attributes properly, and perform the data classification and the data migration, thereby increasing or improving operational efficiency.

Figure 14:
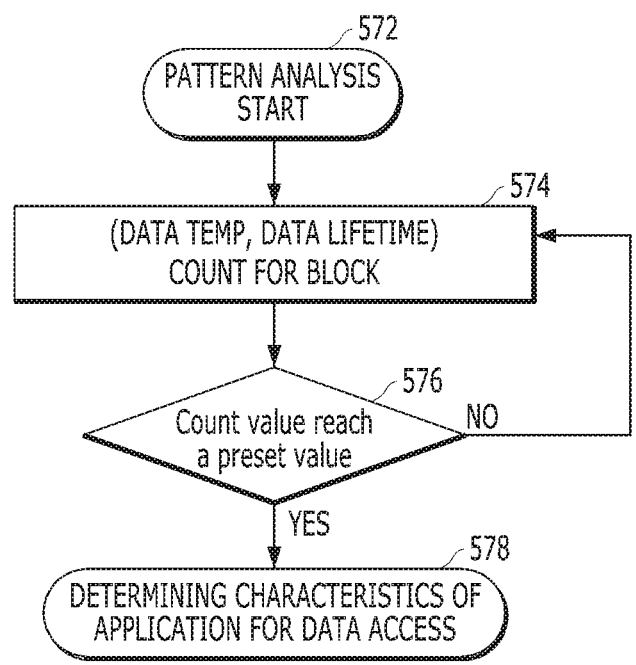
FIG. 14 illustrates a method for recognizing characteristics of an application based on relevant data stored in a memory system.

FIG. 14 illustrates a method of recognizing characteristics of an application based on data stored in a memory system. Once a data attribute of data is determined based on parameters corresponding to a logical address, the change or the trend in the data attribute may be also understood. Through the change or the trend of the data attribute, it is possible to understand how data corresponding to a specific logical block address has been used, and to estimate or predict how the data may be used soon.

Referring to FIG. 14, the memory system may begin a pattern analysis based on changes in data attributes regarding plural pieces of data stored in the memory device (step 572).

After the pattern analysis is started, the data temperature and the data lifetime corresponding to a logical address may be counted (step 574). For example, a count for data temperature and data lifetime may be determined through the method described in FIG. 13.

It may check whether the count for the data temperature and the data lifetime determining a data attribute of data corresponding to a specific logical address reaches a preset value (step 576). Whether the preset value may be related to how much the change of the data attribute corresponding to the logical address has been tracked. For example, when the memory system has not performed a process of determining data attributes due to a data input/output operation and/or garbage collection, and a preset time or period has elapsed, it may be difficult to identify or track the change in data attributes. Thus, a method of tracking changes in data attributes based on the count which indicating the number of determinations regarding a data attribute of data corresponding to a logical address may be more effective than that based on a time.

When the count for the data temperature and the data lifetime reaches a preset value (YES in step 576), it may recognize or grasp characteristics of application or program generating or using data associated with the logical address based on the tracked changed of its data attribute (step 578). A computer device or a host engaged with the memory system may allocate or assign a specific logical address to an application or a program. The memory system may not be able to verify which logical address is assigned to an application because this is controlled by the computing device or the host. However, when the memory system may recognize data attribute corresponding to a logical address commonly used with the host and the change or the trend in the data attribute corresponding to the logical address. The computing device or the host operatively engaged with the memory system may receive information about the change or the trend in the data attribute corresponding to the logical address from the memory system, and identify which application or program uses that logical address. This allows the computing device or the host to recognize data usage or trend for a specific application or program as well as to determine whether an error has occurred. In addition, when such information may be provided to a user via a computing device or a host, the user may determine whether to use the application or program further. When such information may be provided to a developer of a specific application or program, the developer may make improvement or enhancement, or establish a development goal or direction.

In a memory system, a data processing system, and a method for operating and controlling the memory system or the data processing system according to embodiments of the disclosure, data stored in a memory device may be classified according to an attribute of the data such that it is possible to greatly reduce a time required for searching for and extracting valid data for garbage collection. Since the garbage collection may be performed speedily, operation stability and reliability may be improved in a memory system capable of storing voluminous data.

In an embodiment of the disclosure, when data stored in the memory device may be classified according to attributes of the data, classified data may be evenly distributed over plural blocks in the memory device via a plurality of channels, so that efficiency of data transmission through a plurality of channels may be increased and improved.

Further, in embodiments of the disclosure, when data is stored in a block according to attributes of the data, data access on a block-by-block basis may be predicted, estimated or controlled to easily check or improve durability of the memory device.

While the present invention has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A memory system, comprising:
   a memory device including a plurality of memory blocks, wherein at least one memory block among the plurality of memory blocks is allocated for one of data attributes; and
   a controller configured to determine a data lifetime of first data stored in a page of a memory block among the plurality of memory blocks included in the memory device, based on a write count and an erase count included in a first map information item of the first data, and to migrate the first data having a first data attribute of the data lifetime to a first memory block allocated for the first data attribute among the plurality of memory blocks.

2. The memory system according to claim 1, wherein the controller is configured to determine a second data attribute of second data entered from an external device, based on a second map information item of the second data, and to store the second data having the second data attribute to a second memory block allocated for the second data attribute among the plurality of memory blocks.

3. The memory system according to claim 1, wherein the data attributes are distinguished based on a data temperature which indicates an access frequency of data, and the data lifetime reflects a data update period of the data.

4. The memory system according to claim 3, wherein the write count and the erase count of the first data correspond to a first logical address of the first data.

5. The memory system according to claim 3, wherein the first map information item includes a first logical address of the first data and a reference count corresponding to the first logical address,
   the reference count is increased when an update/modification, read or write operation is performed, and
   the data temperature is determined by the reference count.

6. The memory system according to claim 3, wherein the controller is configured to generate an internal command for determining the data temperature and the data lifetime as a background operation, and to reset plural counts used for determining the data temperature and the data lifetime after the data temperature and the data lifetime is determined in response to the internal command.

7. The memory system according to claim 3, wherein the controller is configured to determine, when a write count corresponding to a logical address is greater than an erase count corresponding to the logical address, that:
   the data lifetime is determined to be long when the write count is less than a set threshold; or
   the data lifetime is determined to be short when the write count is greater than or equal to the set threshold.

8. The memory system according to claim 7, wherein the controller is configured to determine that:
   the data lifetime is not available when the write count is equal to the erase count; or
   the write count and the erase count are reset when the write count is less than the erase count.

9. The memory system according to claim 3, wherein the controller is configured to determine that:
   the data temperature corresponding to a logical address is determined to be hot when a reference count corresponding to the logical address is greater than a first threshold;

the data temperature corresponding to the logical address is determined to be cold when the reference count corresponding to the logical address is less than a second threshold; or the data temperature corresponding to the logical address is determined to be warm when the reference count corresponding to the logical address is between the first and second thresholds.

10. The memory system according to claim 1, wherein the controller is configured to perform garbage collection or wear levelling operation for the at least one memory block according to each of the data attributes.

11. The memory system according to claim 1, wherein, when the controller and the memory device are coupled with each other via plural channels, memory blocks allocated alternatively between the plural channels are assigned for each of the data attributes.

12. A method for operating a memory system, comprising:
allocating at least one memory block among a plurality of memory blocks in a memory device for each of data attributes;
determining a first data lifetime of first data stored in a page of a memory block among the plurality of memory blocks included in the memory device based on a write count and an erase count included in a first map information item of the first data; and
migrating the first data having a first data attribute of the first data lifetime to a first memory block allocated for the first data attribute among the plurality of memory blocks.

13. The method according to claim 12, further comprising:
determining a second data attribute of second data entered from an external device, based on a second map information item of the second data; and
storing the second data having the second data attribute to a second memory block allocated for the second data attribute among the plurality of memory blocks.

14. The method according to claim 12, wherein the data attributes are distinguished based on a data temperature which indicates an access frequency of data, and the first data lifetime reflects a data update period of the data.

15. The method according to claim 12, further comprising:
generating an internal command for determining a data temperature and a data lifetime as a background operation; and
resetting plural counts used for determining the data temperature and the data lifetime after the data temperature and the data lifetime is determined in response to the internal command.

16. The method according to claim 12, wherein the determining the first data lifetime includes:
when the write count corresponding to a logical address of the first data is greater than the erase count corresponding to the logical address,
determining that a data lifetime is long when the write count is less than a set threshold; or
determining that the data lifetime is short when the write count is greater than or equal to the set threshold.

17. The method according to claim 16, wherein the determining the first data lifetime further includes:
determining that the data lifetime is not available when the write count is equal to the erase count; or
determining that the write count and the delete count is reset when the write count is less than the erase count.

18. The method according to claim 12, wherein the determining the first data lifetime includes:
determining that a data temperature corresponding to a logical address is hot when a reference count corresponding to the logical address is greater than a first threshold;
determining that the data temperature corresponding to the logical address is cold when the reference count corresponding to the logical address is less than a second threshold; or
determining that the data temperature corresponding to the logical address is warm when the reference count corresponding to the logical address is between the first and second thresholds.

19. The method according to claim 12, further comprising:
performing garbage collection or wear levelling operation for the at least one memory block according to each of the data attributes.

20. An apparatus for controlling firmware in a memory system including at least one processor and at least one memory including computer program code, wherein the at least one memory and the computer program code are configured, with the at least one processor, to cause the apparatus to:
allocate at least one memory block among a plurality of memory blocks in a memory device for each of data attributes;
determine a data lifetime of first data stored in a page of a memory block among the plurality of memory blocks included in the memory device based on a write count and an erase count included in a first map information item of the first data; and
migrate the first data having a first data attribute of the data lifetime to a first memory block allocated for the first data attribute among the plurality of memory blocks.

* * * * *